UNITED STATES PATENT OFFICE.

JEAN AUGUSTE TRILLAT, OF PARIS, FRANCE.

PROCESS OF PRESERVING FOOD.

SPECIFICATION forming part of Letters Patent No. 507,084, dated October 17, 1893.

Application filed May 14, 1892. Serial No. 433,031. (No specimens.)

*To all whom it may concern:*

Be it known that I, JEAN AUGUSTE TRILLAT, a citizen of the Republic of France, residing at Paris, in the Republic of France, have invented certain new and useful Improvements in Processes of Preserving Organic Substances and for Disinfecting; and I do hereby declare the following to be a full, clear, and exact description of the invention, such as will enable others skilled in the art to which it appertains to make and use the same.

My invention consists in a process of treating substances liable to putrefaction, fermentation or mildew, with formaldehyd, whereby they are effectually disinfected and protected against the action of such organisms.

In making bacterological experiments I have discovered that formaldehyd is an excellent antiseptic and that for example it kills the bacteria of anthrax immediately on the addition of a twenty-five thousandth part thereof to the nourishing liquid. By further experiments tried in this direction I have ascertained that putrefaction bacteria, ferment germs, mildew fungus, and the like were also completely impeded in their development by formaldehyd, and on this fact I have based a process for preserving and disinfecting those products which by the action of the organisms mentioned are liable to undergo decomposition, showing indications of putrefaction, fermentation and mildew. When used in the extremely small quantities that are sufficient for preservation of the products, formaldehyd is entirely innocuous, and not the slightest action upon the physical quality of the products can be traced. Meat, vegetables and other victuals for example do not lose anything of their appearance of freshness.

The mode of carrying out the process varies according to the nature of the products to be preserved. Meat and similar substances are immersed for a short time (generally a few seconds will be sufficient) into an aqueous solution of formaldehyd which, when used even in as low a dilution as one twenty-five thousandth part, will have the required action; or the substances are treated with formaldehyd vapor. Liquids to be treated are admixed with the quantity (a small one) of a formaldehyd solution sufficient to produce the effect aimed at.

Having thus described my invention and in what manner it can be performed, that what I claim as new and of my invention is—

The process of preserving (disinfecting) substances which are liable to putrefaction, fermentation or mildew by impregnating or admixing the same with formaldehyd, substantially as set forth.

In testimony whereof I affix my signature in presence of two witnesses.

JEAN AUGUSTE TRILLAT.

Witnesses:
  LOUIS DESHORS,
  F. LAMHET.